United States Patent
Song et al.

(10) Patent No.: US 10,714,077 B2
(45) Date of Patent: Jul. 14, 2020

(54) APPARATUS AND METHOD OF ACOUSTIC SCORE CALCULATION AND SPEECH RECOGNITION USING DEEP NEURAL NETWORKS

(71) Applicant: Samsung Electronics Co., Ltd., Suwon-si (KR)

(72) Inventors: Inchul Song, Suwon-si (KR); Young Sang Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/187,428

(22) Filed: Jun. 20, 2016

(65) Prior Publication Data

US 2017/0025119 A1  Jan. 26, 2017

(30) Foreign Application Priority Data

Jul. 24, 2015 (KR) .................. 10-2015-0105358

(51) Int. Cl.
| | | |
|---|---|---|
| *G10L 15/16* | (2006.01) | |
| *G06N 3/04* | (2006.01) | |
| *G10L 15/04* | (2013.01) | |
| *G10L 15/197* | (2013.01) | |
| *G10L 15/02* | (2006.01) | |
| *G10L 15/14* | (2006.01) | |

(52) U.S. Cl.
CPC .......... *G10L 15/16* (2013.01); *G06N 3/0445* (2013.01); *G10L 15/04* (2013.01); *G10L 15/14* (2013.01); *G10L 15/197* (2013.01); *G10L 15/02* (2013.01)

(58) Field of Classification Search
CPC ......... G10L 15/04; G10L 15/08; G10L 15/16; G10L 15/183; G10L 15/197; G10L 15/02
USPC ................. 704/232, 251, 253, 255
See application file for complete search history.

(56) References Cited

U.S. PATENT DOCUMENTS

| 5,093,899 A | 3/1992 | Hiraiwa | |
| 5,502,790 A * | 3/1996 | Yi | ............ G10L 15/144 |
| | | | 704/243 |

(Continued)

FOREIGN PATENT DOCUMENTS

| JP | 2699447 B2 | 1/1998 |
| JP | 2005-208648 A | 8/2005 |

(Continued)

OTHER PUBLICATIONS

Bou-Ghazale, et al. "Hands-free voice activation of personal communication devices." Acoustics, Speech, and Signal Processing, 2000. ICASSP'00. Proceedings. 2000 IEEE International Conference on. vol. 3. IEEE, Aug. 2000, pp. 1735-1738.*

(Continued)

*Primary Examiner* — James S Wozniak
(74) *Attorney, Agent, or Firm* — NSIP Law

(57) ABSTRACT

An apparatus for calculating acoustic score, a method of calculating acoustic score, an apparatus for speech recognition, a method of speech recognition, and an electronic device including the same are provided. An apparatus for calculating acoustic score includes a preprocessor configured to sequentially extract audio frames into windows and a score calculator configured to calculate an acoustic score of a window by using a deep neural network (DNN)-based acoustic model.

27 Claims, 11 Drawing Sheets

(56) References Cited

U.S. PATENT DOCUMENTS

| | | | |
|---|---|---|---|
| 5,668,926 | A | 9/1997 | Karaali et al. |
| 5,903,863 | A | 5/1999 | Wang |
| 5,913,194 | A | 6/1999 | Karaali et al. |
| 6,041,299 | A | 3/2000 | Schuster et al. |
| 6,173,258 | B1 | 1/2001 | Menendez-Pidal et al. |
| 6,308,155 | B1 | 10/2001 | Kingsbury et al. |
| 6,317,710 | B1* | 11/2001 | Huang ............... G10L 17/00 704/231 |
| 6,453,283 | B1* | 9/2002 | Gigi .................. G10L 25/90 704/201 |
| 6,453,284 | B1 | 9/2002 | Paschall |
| 6,947,890 | B1 | 9/2005 | Kitazoe et al. |
| 6,999,920 | B1 | 2/2006 | Matt et al. |
| 7,480,615 | B2 | 1/2009 | Attias et al. |
| 7,496,548 | B1 | 2/2009 | Ershov |
| 8,527,276 | B1 | 9/2013 | Senior et al. |
| 8,725,498 | B1* | 5/2014 | Sung ................ G10L 25/48 704/207 |
| 9,666,203 | B2* | 5/2017 | Franck ............... G10L 19/26 |
| 9,842,585 | B2* | 12/2017 | Huang ............... G10L 15/063 |
| 10,019,990 | B2* | 7/2018 | Li ..................... G10L 15/20 |
| 2003/0204398 | A1 | 10/2003 | Haverinen et al. |
| 2006/0178880 | A1* | 8/2006 | Zhang ............... G10L 21/0208 704/233 |
| 2007/0233471 | A1* | 10/2007 | Ariu ................. G06F 17/289 704/215 |
| 2008/0114595 | A1* | 5/2008 | Vair .................. G10L 15/08 704/236 |
| 2009/0220065 | A1* | 9/2009 | Ahuja ............... H04M 3/569 379/202.01 |
| 2011/0218803 | A1 | 9/2011 | Ketabdar et al. |
| 2012/0076323 | A1* | 3/2012 | Disch ................ G10L 19/025 381/97 |
| 2013/0332148 | A1* | 12/2013 | Ravelli .............. G10L 19/012 704/203 |
| 2014/0149112 | A1* | 5/2014 | Kalinli-Akbacak .... G10L 25/03 704/232 |
| 2014/0288928 | A1* | 9/2014 | Penn ................. G10L 15/16 704/232 |
| 2014/0348337 | A1* | 11/2014 | Franck ............... H04R 3/12 381/59 |
| 2015/0039304 | A1* | 2/2015 | Wein ................. G10L 25/78 704/233 |
| 2015/0095027 | A1* | 4/2015 | Parada San Martin ............... G10L 15/02 704/232 |
| 2015/0127594 | A1 | 5/2015 | Parada San Martin et al. |
| 2015/0149165 | A1* | 5/2015 | Saon ................. G10L 15/063 704/232 |
| 2015/0161522 | A1* | 6/2015 | Saon ................. G06N 3/08 706/12 |
| 2015/0340032 | A1* | 11/2015 | Gruenstein ......... G10L 15/16 704/232 |
| 2015/0371631 | A1* | 12/2015 | Weinstein .......... G10L 15/08 704/256.4 |
| 2015/0371665 | A1* | 12/2015 | Naik ................. G10L 25/78 704/248 |
| 2016/0171974 | A1* | 6/2016 | Hannun ............. G10L 15/063 704/232 |
| 2016/0217367 | A1* | 7/2016 | Moreno ............. G10L 15/16 |
| 2017/0092268 | A1* | 3/2017 | Kristjansson ....... G10L 15/20 |

FOREIGN PATENT DOCUMENTS

| | | |
|---|---|---|
| KR | 10-0202424 B1 | 6/1999 |
| KR | 10-2004-0100592 A | 12/2004 |
| WO | WO 00/14724 | 3/2000 |

OTHER PUBLICATIONS

Chen, Z., et al. "Integration of speech enhancement and recognition using long-short term memory recurrent neural network." Proc. Interspeech. Sep. 2015, pp. 1-7.*

Chen, Kai, et al. "A context-sensitive-chunk BPTT approach to training deep LSTM/BLSTM recurrent neural networks for offline handwriting recognition." Document Analysis and Recognition (ICDAR), 2015 13th International Conference on. IEEE, Aug. 2015, pp. 411-415.*

Chorowski, Jan, et al. "End-to-end continuous speech recognition using attention-based recurrent NN: first results." arXiv preprint arXiv:1412.1602, Dec. 2014, pp. 1-10.*

Hannun, Awni, et al. "Deep speech: Scaling up end-to-end speech recognition." arXiv preprint arXiv:1412.5567, Dec. 2014, pp. 1-12.*

Maas, Andrew L., et al. "Lexicon-free conversational speech recognition with neural networks." Proc. NAACL. Jun. 2015, pp. 345-354.*

Abdel-Hamid, Ossama, et al. "Applying convolutional neural networks concepts to hybrid NN-HMM model for speech recognition." Acoustics, Speech and Signal Processing (ICASSP), 2012 IEEE International Conference on. IEEE, Mar. 2012, pp. 4277-4280.*

Hannun, Awni Y., et al. "First-pass large vocabulary continuous speech recognition using bi-directional recurrent DNNs." arXiv:1408.2873, Dec. 2014, pp. 1-7. (Year: 2014).*

Li, Jinyu, et al. "Factorized adaptation for deep neural network." In Acoustics, Speech and Signal Processing (ICASSP), 2014 (Year: 2014).*

Yao, Kaisheng, et al. "Adaptation of context-dependent deep neural networks for automatic speech recognition." Spoken Language Technology Workshop (SLT), 2012 IEEE. IEEE, Dec. 2012, pp. 366-369. (Year: 2012).*

Seltzer, Michael L., et al. "Multi-task learning in deep neural networks for improved phoneme recognition." Acoustics, Speech and Signal Processing (ICASSP), 2013 IEEE International Conference on. IEEE, May 2013, pp. 6965-6969. (Year: 2013).*

Senior, Andrew, et al. "Improving DNN speaker independence with i-vector inputs." Acoustics, Speech and Signal Processing (ICASSP), 2014 IEEE International Conference on. IEEE, May 2014, pp. 225-229. (Year: 2014).*

Li, Jinyu, et al. "Improving wideband speech recognition using mixed-bandwidth training data in CD-DNN-HMM." Spoken Language Technology Workshop (SLT), 2012 IEEE. IEEE, Dec. 2012, pp. 131-136. (Year: 2012).*

Hinton, Geoffrey, et al. "Deep neural networks for acoustic modeling in speech recognition: The shared views of four research groups." IEEE Signal processing magazine 29.6, Nov. 2012, pp. 82-97. (Year: 2012).*

Mitra, Vikramjit, et al. "Evaluating robust features on deep neural networks for speech recognition in noisy and channel mismatched conditions." Fifteenth Annual Conference of the International Speech Communication Association. Sep. 2014, pp. 895-899. (Year: 2014).*

Alex Graves, et al., "Speech Recognition with Deep Recurrent Neural Networks," *Proceedings from the International Conference on Acoustics, Speech, and Signal Processing*, May 26-31, 2013, ICASSP 2013, pp. 6645-6649.

Xin Lei, et al., "Accurate and Compact Large Vocabulary Speech recognition on Mobile Devices," *Proceeding from the Interspeech*, Aug. 25, 2013, pp. 662-665.

Extended European Search Report dated Oct. 14, 2016, in counterpart European Application No. 16180760.7 (8 pages, in English).

Santos, José. "Codon Based Amino Acid Encoding for the Neural Network Prediction of Protein Secondary Structure." *5th Annual Spanish Bioinformatics Conference*, 2004, (101-106).

Collobert, Ronan, et al. "Natural Language Processing (almost) from Scratch." *The Journal of Machine Learning Research*, (http://arxiv.org/abs/1103.0398), 2011, (47 pages).

European Search Report issued by the European Patent Office (EPO) dated Nov. 30, 2016 in counterpart International Application No. 16193988.9 (9 pages).

Pan, Jia, et al. "Investigation of deep neural networks (DNN) for large vocabulary continuous speech recognition: Why DNN surpasses GMMs in acoustic modeling." Chinese Spoken Language Processing (ISCSLP), 2012 8th International Symposium on. IEEE, 2012.

(56) References Cited

OTHER PUBLICATIONS

Viikki, Olli, and Kari Laurila. "Cepstral domain segmental feature vector normalization for noise robust speech recognition." Speech Communication 25.1 (1998): 133-147.
Extended European Search Report dated Mar. 15, 2017 in counterpart European Patent Application No. 16193988.9 (15 pages, in English).
Alex Graves, et al., "Hybrid Speech Recognition with Deep Bidirectional LSTM," *Proceedings from the IEEE Workshop on Automatic Speech Recognition and Understand (ASRU)*, Dec. 8-12, 2013 (6 pages, in English).
Hasim Sak, et al., "Long Short-Term Memory Recurrent Neural Network Architectures for Large Scale Acoustic Modeling", *Interspeech 2014*, Sep. 14-18, 2014, Singapore, pp. 338-342.
M. Schuster, et al. "Bidirectional Recurrent Neural Networks." *IEEE Transactions on Signal Processing*, vol. 45, No. 11, Nov. 1997, pp. 2673-2681.
A. Graves, et al. "Hybrid Speech Recognition With Deep Bidirectional LSTM." *IEEE Workshop on Automatic Speech Recognition and Understanding (ASRU)*, Dec. 12, 2013. pp. 273-278.

* cited by examiner

APPARATUS AND METHOD OF ACOUSTIC SCORE CALCULATION AND SPEECH RECOGNITION USING DEEP NEURAL NETWORKS

CROSS-REFERENCE TO RELATED APPLICATION(S)

This application claims the benefit under 35 USC 119(a) of Korean Patent Application No. 10-2015-0105358 filed on Jul. 24, 2015, in the Korean Intellectual Property Office, the entire disclosure of which is incorporated herein by reference for all purposes.

BACKGROUND

1. Field

The following description relates to speech recognition technology and to a method and an apparatus for performing incremental speech recognition that uses a deep neural network.

2. Description of Related Art

A speech recognition engine generally includes a decoder, an acoustic model and a language model. The decoder uses the acoustic model and the language model to perform the decoding of an input audio signal. For instance, in response to receiving an input audio signal, the speech recognition engine may use the acoustic model to calculate pronunciation probabilities of each frame of the input audio signal, and the language model may provide information on the frequency of use of specific words or sentences. The decoder calculates and outputs similarities of the input audio signal to words or sentences based on information provided by the acoustic model and the language model in order to convert the input audio signal into a sequence or a word. A Gaussian mixture model is often used as an acoustic model; however, a deep neural network (DNN)-based acoustic model has been recently introduced and has shown potentials for significantly improved speech recognition performance. A bidirectional recurrent deep neural network (BRDNN), for instance, is suitable for modeling data that changes with time, such as speech.

However, the BRDNN calculates pronunciation probabilities of each frame of an audio signal by considering bidirectional information, i.e., information on previous and subsequent frames. Thus, when a BRDNN is used in speech recognition, an entire speech is provided as an input audio signal. Accordingly, a BRDNN is not suitable for incremental decoding, in which a speech recognition result is incrementally output while a user is delivering a speech.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for calculating acoustic score includes a preprocessor configured to sequentially extract audio frames into windows and a score calculator configured to calculate an acoustic score of a window by using a deep neural network (DNN)-based acoustic model.

The DNN may be a bidirectional recurrent deep neural network (BRDNN).

The general aspect of the apparatus may further include a padding adder configured to add padding frames to both sides of the window.

The padding frames added to the window may overlap with one or more frames of a window adjacent to the window.

In response to an acoustic score of the window being calculated, the apparatus may recalculate an acoustic score of the overlapping frames of the window by using a statistical method based on a pre-calculated acoustic score of the padding frames of the adjacent window.

The statistical method may include calculating at least one of an arithmetic mean and a geometric mean.

A size of the window or a size of the padding frames may be determined based on one or more of a speech recognition application field and computing performance capability of a device applied with the apparatus In another general aspect, a method of calculating an acoustic score involves sequentially extracting audio frames into windows and calculating an acoustic score of a window by using a deep neural network (DNN)-based acoustic model.

The DNN may be a bidirectional recurrent deep neural network (BRDNN).

The general aspect of the method may further involve adding padding frames to both sides of the window.

The padding frames added to the window may overlap with one or more frames of a window adjacent to the window.

The general aspect of the method may further involve re-calculating an acoustic score of the overlapping frames of the window by using a statistical method based on a pre-calculated acoustic score of the padding frames of the adjacent window.

The statistical method may involve at least one of an arithmetic mean and a geometric mean.

A size of the window or a size of the padding frames may be determined based on one or more of a speech recognition application field and computing performance capability of a device performing the method.

In another general aspect, a speech recognition apparatus includes a preprocessor configured to extract frames of an audio signal into windows while the frames are successively input; an acoustic model applier configured to output an acoustic score of a window by using a deep neural network (DNN)-based acoustic model; and a decoder configured to output an incremental recognition result, obtained up to a current window, based on the output acoustic score of the window.

The general aspect of the apparatus may further include a language model applier configured to output a word/sentence score by using a language model, wherein the decoder outputs the incremental recognition result, obtained up to the current window, further based on the output word/sentence score.

In response to predetermined criteria being satisfied, the decoder may output the incremental recognition result obtained up to the current window as a final recognition result of the audio signal.

The DNN may be a bidirectional recurrent deep neural network (BRDNN).

The language model may be based on an n-gram or a neural network.

The acoustic model applier may add padding frames to both sides of the window, and may calculate the acoustic score of each frame of the window, to which the padding frames are added, wherein the acoustic score of the window may be calculated by considering a pre-calculated acoustic score of the padding frames of a window adjacent to the window.

In another general aspect, a speech recognition method involves extracting frames of an audio signal to be recognized in a window while the frames are successively input; outputting an acoustic score of the window by using a deep neural network (DNN)-based acoustic model; and outputting an incremental recognition result, obtained up to a current window, based on the output acoustic score of the window.

The general aspect of the method may further involve outputting a word/sentence score by using a language model, wherein the outputting of the incremental recognition result may involve outputting the incremental recognition result, obtained up to the current window, further based on the output word/sentence score.

The general aspect of the method may further involve determining whether predetermined criteria are satisfied, and in response to a determination that the predetermined criteria are satisfied, outputting the incremental recognition result obtained up to the current window as a final recognition result of the audio signal.

The general aspect of the method may further involve adding padding frames on both sides of the window, wherein the outputting of the acoustic score may involve calculating the acoustic score of each frame of the window, to which the padding frames are added, by considering a pre-calculated acoustic score of the padding frames of a window adjacent to the window.

In another general aspect, an electronic device may include a speech input device configured to receive an audio signal from a user; a speech recognizer configured to recognize the audio signal of the user by outputting an acoustic score of frames of the input audio signal in a window by using a deep neural network (DNN)-based acoustic model while the audio signal is input, and by incrementally decoding the output acoustic score of the window; and a processor configured to perform a predetermined operation based on the recognition result.

The operation may involve at least one of outputting the recognition result in voice or in a text format, translation of the recognition result into another language, and processing of commands for controlling the electronic device.

In another general aspect, an apparatus for calculating acoustic score includes one or more processors configured to sequentially extract audio frames into windows; add padding frames to one or more sides of a windows; and calculate an acoustic score of the window by using a deep neural network (DNN)-based acoustic model.

The general aspect of the apparatus may further include a transducer that obtains an input audio signal, the processor extracting the audio frames from the input audio signal.

The processor may be configured incrementally decode acoustic scores of the windows.

In another general aspect, a speech recognition method involves extracting frames of an audio signal into windows using one or more processors; padding a window with padding frames corresponding to one or more frames of an adjacent window; and calculating an acoustic score of the window to incrementally recognize the audio signal.

The calculating of the acoustic score may involve inputting the window into a deep neural network (DNN)-based acoustic model.

The DNN-based acoustic model may include a processor and a non-transitory memory.

The general aspect of the method may further involve using a transducer to obtain the audio signal.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, various examples of an apparatus and method for calculating acoustic scores, an apparatus and method for speech recognition, and an electronic device will be described with reference to the accompanying drawings.

Figure 1:
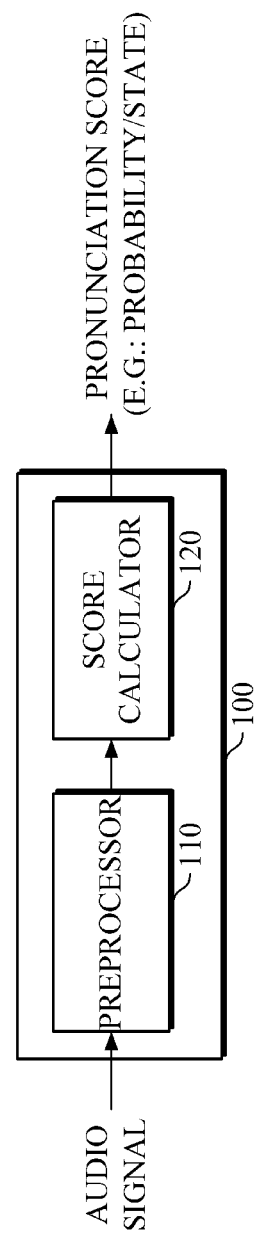
FIG. 1 is a block diagram illustrating an example of an apparatus for calculating acoustic scores.

FIG. 1 is a block diagram illustrating an example of an apparatus for calculating acoustic scores.

Referring to FIG. 1, the apparatus 100 for calculating acoustic scores includes a preprocessor 110 and a score calculator 120. The preprocessor 110 and the score calculator 120 may be implemented with one or more circuits, processors, memories or a combination thereof.

The preprocessor 110 converts an audio signal to be recognized into audio frames, and extracts the audio frames into windows. In one example, the preprocessor 110 sequentially extracts the audio frames by dividing the audio frames into successive windows, so that the audio frames may not overlap each other. The preprocessing process may involve extracting certain characteristics from the audio signal and converting the audio signal into audio frames. The audio frames may include one or more phonemes, which is the smallest unit of sound that is significant in a language.

For example, assuming that the number of audio frames of an audio signal to be recognized is N, and a predetermined size of a window is K, the preprocessor 110 waits until a first to a k-th frames are input. After the k-th frame is input, the preprocessor 110 outputs the first to the k-th frames into a first window (W1). Subsequently, the preprocessor 110 outputs a k+1-th to a 2k-th frames into a second window (W2), and continues to extract windows in units of k number of frames until a final frame is input.

The size of windows may be determined based on application fields of speech recognition, computing performance capability of applied devices, and the like, but is not limited thereto, and other various criteria may be considered. The number of windows may be determined to be smaller than the number of frames present in the entire audio signal.

For example, if speech recognition is used for translation into another language, it may be more important to provide the results of speech recognition accurately rather than rapidly. Thus, the size of the windows may be set to be relatively large, thereby increasing accuracy.

In another example, if speech recognition is used for processing oral commands given to electronic devices, such as a TV set, the number of commands related to such electronic device is limited. Thus, it may be more important to process commands rapidly, such that the size of the windows may be set to be relatively small, thereby increasing the speed of speech recognition.

In addition, the size of the windows may be determined by considering the computing performance capability of a device to which the speech recognition technology is applied. The device may be, but is not limited to, a TV set, a navigation device, a vehicle electronic device, a smartphone, a tablet PC, a smart watch, a desktop computer, a laptop computer, and the like.

The size of windows may be predetermined according to various criteria, or the preprocessor 110 may dynamically determine or adjust the size of windows during the process of speech recognition by collecting criteria determined by a user, computing performance capability, and the like.

The score calculator 120 may calculate acoustic scores of each window by using a deep neural network (DNN) acoustic model. The DNN acoustic model may be a BRDNN. The acoustic scores may include probabilities or state information of phonemes, pronunciations, morphemes, syllables, or words. However, the acoustic scores are not limited thereto, and may include probabilities or state information of all possible language units that may be morphologically divided. Hereinafter, for convenience of explanation, pronunciation scores, i.e., probabilities of pronunciations, among acoustic scores, will be used as an example.

Each time a window is extracted by the preprocessor 110, the score calculator 120 inputs frames included in the extracted window to an acoustic model, and calculates pronunciation scores of each frame included in the extracted window. In this manner, the score calculator 120 calculates pronunciation scores of each window extracted by the preprocessor 110. According to an example, the pronunciation scores may include probabilities of pronunciations (e.g., A, E, I, O, and U) or specific information of a specific frame.

In this example, the pronunciation probabilities are calculated by inputting the audio frames of each window into an acoustic model, rather than inputting the entire audio frames into an acoustic model, such that a speech recognition apparatus may incrementally decode a user's speech while a user is inputting the speech, thereby returning results of the speech recognition real-time.

Figure 2:
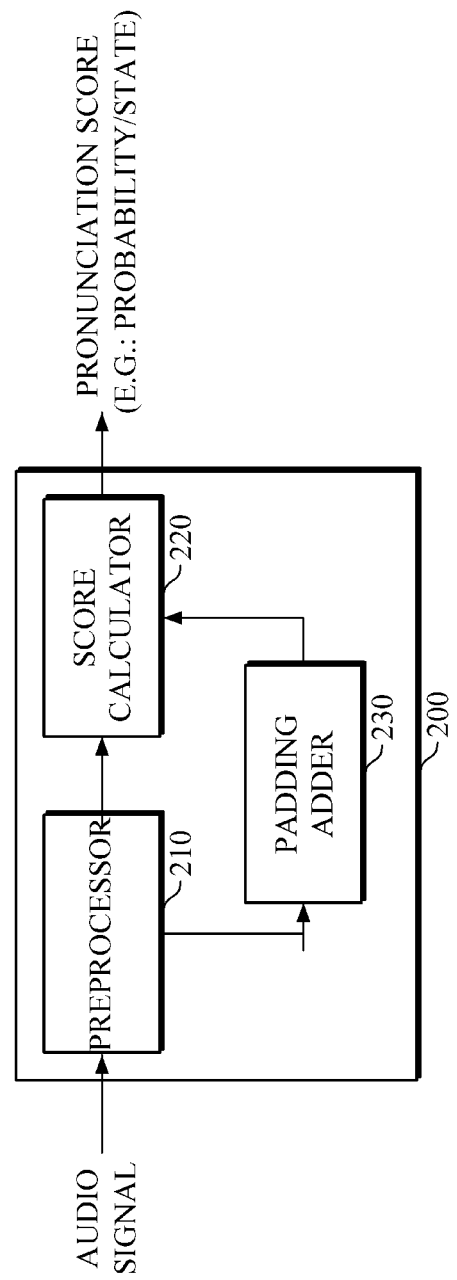
FIG. 2 is a block diagram illustrating another example of an apparatus for calculating acoustic scores.

FIG. 2 is a block diagram illustrating another example of an apparatus for calculating acoustic scores.

Referring to FIG. 2, the apparatus 200 for calculating acoustic scores includes a preprocessor 210, a score calculator 220, and a padding adder 230. The preprocessor 210, the score calculator 220 and the padding adder 230 may be implemented with one or more circuits, processors, memories or a combination thereof. The preprocessor 210 and the padding adder 230 are divided according to functions; in an example, the preprocessor 210 may perform entirely or partially the function of the padding adder 230. The preprocessor 210 and the score calculator 220 are the same as the preprocessor 210 and the score calculator 220 of the apparatus 100 for calculating acoustic scores illustrated in FIG. 1. Thus, repetitive descriptions of the preprocessor 210 and the score calculator 220 will be omitted for conciseness.

In this example, the preprocessor 210 converts an audio signal to be recognized into audio frames, and sequentially extracts the audio frames into successive windows by dividing the audio signal, so that the audio frames may not overlap each other. The size of the windows may be determined based on the application field of speech recognition, the computing performance capability of the applied device, and the like, but is not limited thereto; the size of the windows may be determined by considering other various criteria. The number of windows in an audio signal may be set to be smaller than the number of frames in the audio signal. A window may include a plurality of frames.

In an example in which speech recognition is used in applications such as translation, the accuracy of speech recognition is important. Thus, the size of windows may be set to be relatively large. In another example in which the speech recognition is used in an embedded environment in which a limited number of commands are processed, the speed of speech recognition is more important. Thus, the size of windows may be set to be relatively small.

The preprocessor 210 may extract windows from an audio signal based on a predetermined size of a window, or may extract windows by dynamically determining the size of windows based on the above criteria.

In this example, after a window is extracted by the preprocessor 210, the padding adder 230 adds padding frames on both sides of the extracted window.

In a general acoustic model based on BRDNN, bidirectional frame information is considered when pronunciation probabilities of a specific frame are calculated. In an example in which windows are individually processed, the pronunciation scores of frames that are close to a left end and a right end of the frames included in a specific window may not be accurate due to insufficient information near the left end and a right end of frames.

Accordingly, the padding adder 220 may add, as padding frames of a current window, some frames of previous and subsequent windows that are adjacent to the current window. The added padding frames are used to provide additional information when the pronunciation probabilities of frames included in the current window are calculated. In this example, the padding size, i.e., the number of padding frames to be added to the current window, may be determined according to various criteria, such as application fields of speech recognition, computing performance capability of applied devices, and the like.

For example, if a window size (k) is 4, a left padding size (LP) is 2, and a right padding size (RP) is 2, two frames are added to both sides of four frames of an extracted current window, such that a total of eight frames may be a unit of windows to be input to the score calculator 220. However, in the event that a current window is the first window (W1), the number of padding frames added to its left side is 0, and in the event that a current window is the last window, the number of padding frames added to its right side may be from 0 to 2.

That is, in response to the preprocessor 210 extracting frames 1 to 4 as the first window (W1), the padding adder 230 adds frames 5 and 6, which are input thereafter, to the right side of the first window (W1). In this example, the preprocessor 220 extracts frames 5 to 8 as the second window (W2), and the padding adder 230 adds frames 3 and 4, which are included in the first window (W1) and adjacent to the second window (W2), to the left side of the second window (W2), and adds frames 9 and 10, which are input thereafter, to the right side of the second window (W2). The preprocessor 210 and the padding adder 230 repeat this process until the last audio frame is input.

The score calculator 220 may calculate pronunciation scores of windows by using a deep neural network (DNN) acoustic model. In this example, the DNN acoustic model may be a bidirectional recurrent deep neural network (BRDNN) acoustic model.

Further, after the preprocessor 210 extracts a window, and the padding adder 230 adds padding frames to the extracted window, the score calculator 220 inputs a current window, to which padding frames are added, into an acoustic model to calculate pronunciation scores of each frame included in the window and padding frames.

In one example, after pronunciation scores of each frame included in a current window and padding frames are calculated by using an acoustic model, the score calculator 220 determines whether some frames included in the current window and padding frames of adjacent windows overlap with each other. In response to a determination that there are overlapping frames, the score calculator 220 may recalculate the pronunciation scores of some frames of the current window based on pre-calculated pronunciation scores of the overlapping padding frames of the adjacent windows.

For example, assuming that a specific pronunciation score of some frames (F) of the current window is a, and a specific pronunciation score of padding frames (F) of adjacent windows is b, the score calculator 220 may calculate a final score s(f) of frames (F) of the current window by obtaining an arithmetic mean using the following Equation 1.

$$s(f)=(a+b)/2 \quad \text{[Equation 1]}$$

In another example, the score calculator 220 may calculate a final score s(f) of some frames (F) of the current window by obtaining a geometric mean using the following Equation 2.

$$s(f)=(a*b)^{(1/2)} \quad \text{[Equation 2]}$$

In yet another example, the score calculator 220 may calculate a final score s(f) of some frames (F) of the current window by applying different weighted values to a and b, and by obtaining an arithmetic mean or a geometric mean using the following Equation 3 or 4.

$$s(f)=(1-a)*a+a*b \quad \text{[Equation 3]}$$

$$s(f)=a^{\wedge}(1-a)*b^{\wedge}a \quad \text{([Equation 4]}$$

As described above, a final score is calculated by combining pronunciation scores that are calculated two times for two successive windows, such that scores may be calculated more accurately. The above Equations 1 to 4 are merely examples, and other statistical methods may also be used to calculate scores of overlapping frames.

Figure 3:
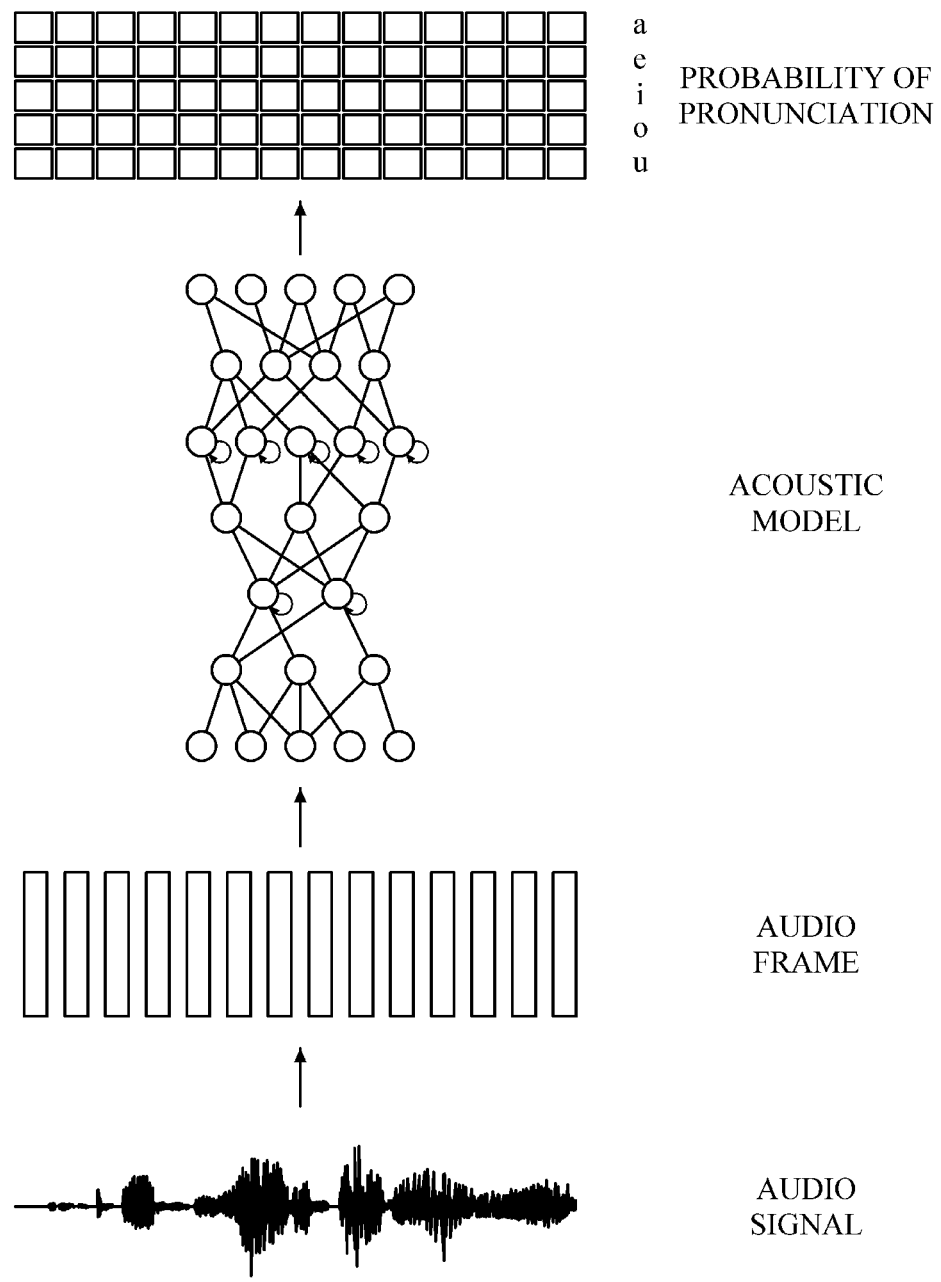
FIG. 3 is a diagram explaining the operation of an acoustic model based on a bidirectional recurrent deep neural network (BRDNN).
Figure 4:
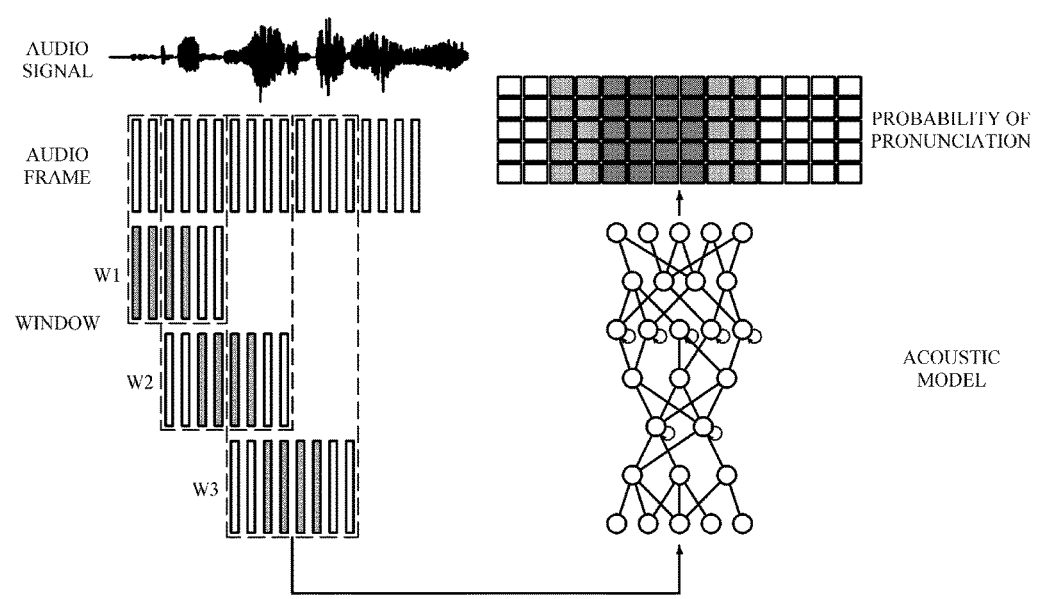
FIGS. 4 and 5 are diagrams explaining the operation of an example of an acoustic model based on BRDNN.
Figure 5:
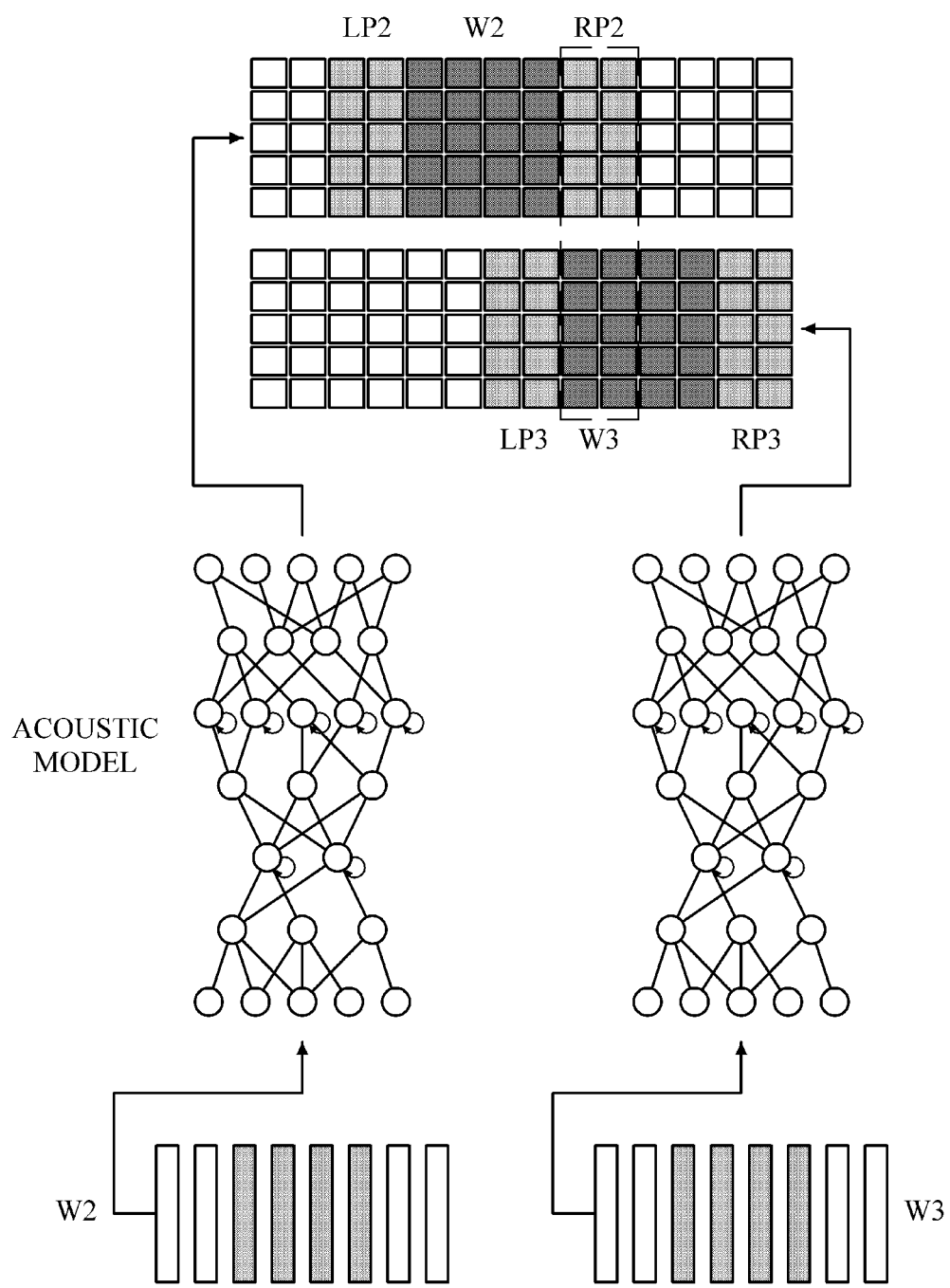

FIG. 3 is a diagram explaining the operation of a general acoustic model based on bidirectional recurrent deep neural network (BRDNN). FIGS. 4 and 5 are diagrams explaining an example of an acoustic model based on BRDNN.

Referring to FIG. 3, in an acoustic model based on BRDNN, an entire audio signal is input to the acoustic model at once, and all of the audio frames extracted from the entire audio signal are input to the input nodes of the acoustic model. Then, the BRDNN acoustic model outputs the probabilities of pronunciations (e.g.: A, E, I, O, U) of all of the audio frames.

Referring to examples of BRDNN acoustic models illustrated in FIGS. 4 and 5, an apparatus 200 for calculating acoustic scores inputs audio frames of each window into the input nodes of the BRDNN acoustic model while a stream of an audio signal is being input, and the BRDNN acoustic model outputs the pronunciation probabilities of each window sequentially while the stream of the audio signal is being input to the apparatus 200.

In the example illustrated in FIGS. 4 and 5, it is assumed that the window size corresponds to 4 frames, the padding size corresponds to 2 frames, and the audio frames are input from the left to the right in a time-sequential order, in which frames 1, 2, 3, 4, . . . , 18 are sequentially received.

Referring to FIG. 4, while an audio signal is input, the preprocessor 210 waits until four audio frames, which correspond to a window size, are input. After receiving frames 1 to 4, the preprocessor 210 extracts the first window (W1). In this example, after frames 5 and 6 are input, the padding adder 230 adds, as padding frames, frames 5 and 6 to the right side of the first window (W1).

In response to the padding frames being added to the first window (W1), the score calculator 220 inputs each frame of the first window (W1), i.e., frame 1 to 6 into an acoustic model, and outputs pronunciation probabilities.

Subsequently, in response to frames 5 to 8 being input, the preprocessor 210 extracts the second window (W2). In this example, when the second window (W2) is extracted, the padding adder 230 adds, as padding frames, frames 3 and 4 included in the first window (W1) to the left side of the second window (W2), and then adds frames 9 and 10, which are input thereafter, to the right side of the second window (W2) as padding frames.

Similarly, in response to padding frames being added to the second window (W2), the score calculator 220 inputs each frame of the second window (W2), i.e., frames 3 to 10 into an acoustic model, and outputs pronunciation probabilities with respect to the second window (W2).

The preprocessor 210, the padding adder 230, and the score calculator 220 calculate pronunciation scores of each window by repeating the above process while an audio signal is being successively input.

FIG. 5 illustrates an example of a method of calculating pronunciation scores by sequentially inputting the second window (W2) and a third window (W3) into an acoustic model. In this example, the acoustic model, such as the BRDNN acoustic model, uses left and right padding frames (LP2 and RP2) when calculating scores of frames included in the second window (W2), and uses left and right frames (LP3 and RP3) when calculating scores of frames included in the third window (W3).

As described above, some frames of the third window (W3) overlap with the right padding frames (RP2) of the second window (W2). In this example, the score calculator 220 recalculates pronunciation scores of the right padding frames (RP2) of the second window (W2) and pronunciation scores of frames included in the third window (W3) by using the aforementioned statistical methods, and results of the calculation may be output as a final pronunciation score of overlapping frames included in the third window (W3).

Figure 6:
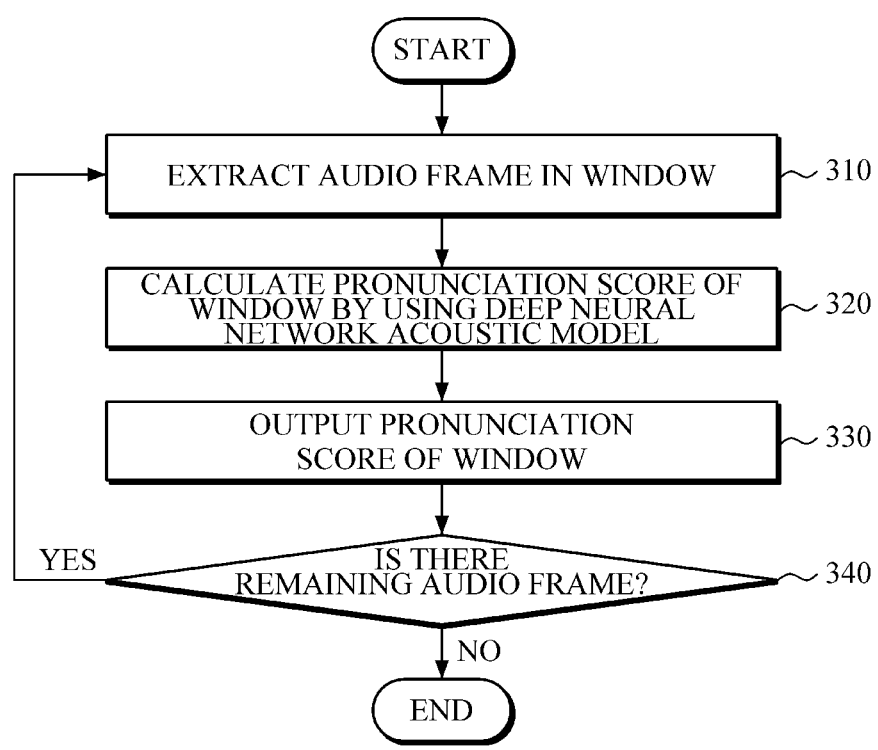
FIG. 6 is a flowchart illustrating an example of a method of calculating acoustic scores.

FIG. 6 is a flowchart illustrating an example of a method of calculating acoustic scores.

The example illustrated in FIG. 6 may be performed by the apparatus 100 for calculating acoustic scores illustrated in FIG. 1, which may be construed as described above, and a detailed description thereof will be omitted.

First, the apparatus 100 for calculating acoustic scores converts an audio signal to be recognized into audio frames, and extracts the audio frames in windows in 310 in a sequential manner such that the audio frames may not overlap with each other. The window size may be determined according to various criteria, including the application field of speech recognition, the computing performance capability of the applied devices, and the like. Alternatively, the window size may be predetermined or dynamically determined or adjusted during the process of speech recognition.

Then, the apparatus 100 for calculating acoustic scores may calculate pronunciation scores of windows by using the DNN acoustic model in 320, in which the DNN acoustic model may be a BRDNN acoustic model.

Each time a window is extracted, the apparatus 100 for calculating acoustic scores may sequentially input the extracted window into an acoustic model to calculate the pronunciation scores of each window.

Subsequently, the apparatus 100 for calculating acoustic scores may output, in 330, pronunciation scores of each window, which are calculated in 320, so that a speech recognition apparatus may perform incremental speech recognition.

Then, while there are additional audio frames remaining to be input in 340, the operation of extracting windows in 310 and subsequent operations are repeated. After the input of audio frames is completed, with no additional audio frame remaining to be input in 340, the calculation of scores ends.

Figure 7:
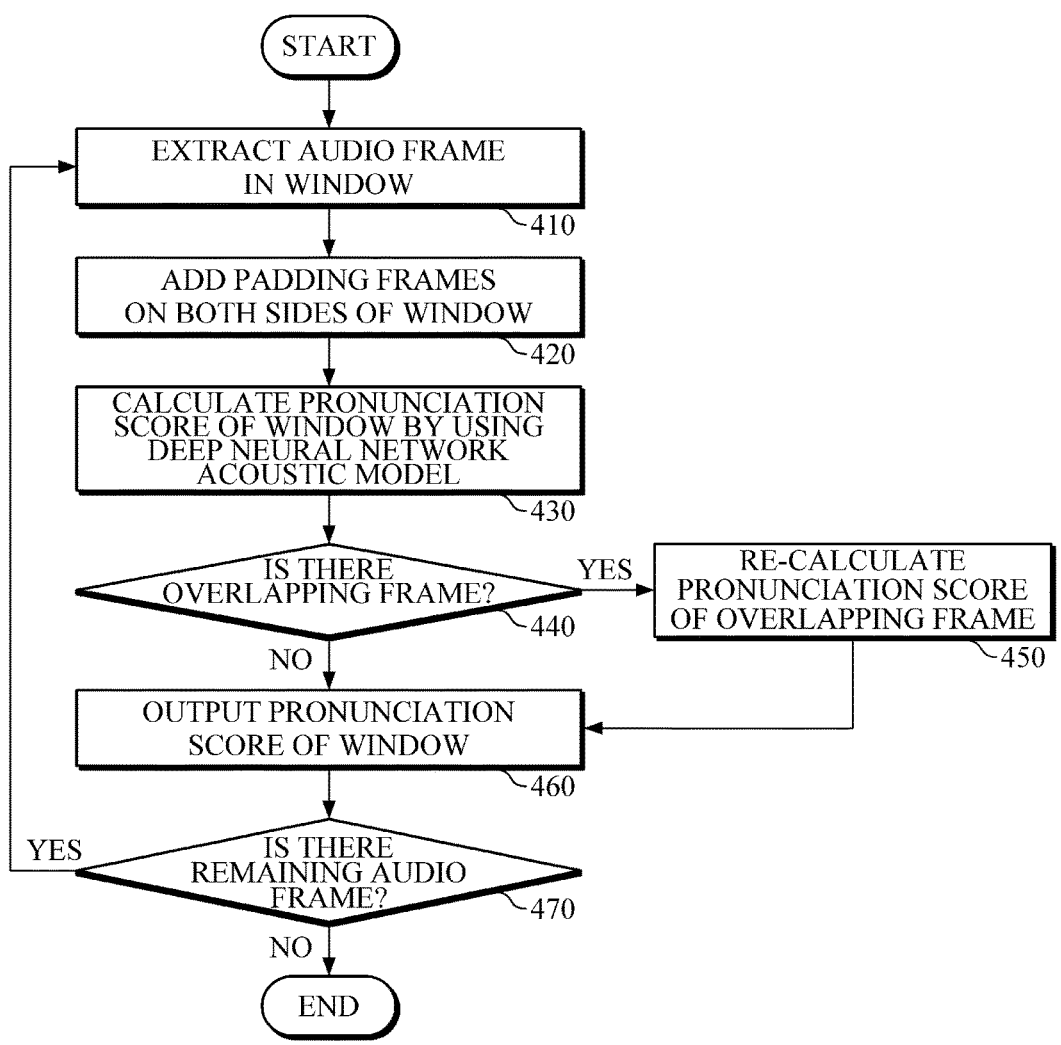
FIG. 7 is a flowchart illustrating an example of a method of calculating acoustic scores.

FIG. 7 is a flowchart illustrating another example of a method of calculating acoustic scores.

The method of calculating acoustic scores illustrated in FIG. 7 may be performed by the apparatus 200 for calculating acoustic scores. The apparatus 200 and the operations performed by the apparatus 200 are described above with reference to FIGS. 2 to 5. Thus, a repetitive description thereof will be omitted for conciseness.

The apparatus 200 for calculating acoustic scores converts an audio signal to be recognized into audio frames, and extracts the audio frames into windows in 410 by dividing the audio frames into successive windows, so that the audio frames do not overlap with each other. The window size may be determined according to various criteria, including application fields of speech recognition, the computing performance capability of applied devices, and the like, and the size of a window may be determined to be smaller than the number of frames of an entire audio signal.

Then, after a window is extracted, padding frames are added to both sides of the extracted current window in 420. In this example, some frames of previous and subsequent windows that are adjacent to the current window may be added as padding frames of the current window. The added padding frames may be used to provide additional information when the pronunciation probabilities of frames included in the current window are calculated. The padding size may be determined according to various criteria, including the application field of speech recognition, the computing performance capability of applied devices, and the like.

Next, pronunciation scores of each frame of sequentially extracted windows are calculated by using the DNN acoustic model in 430. In this example, the DNN acoustic model may be a BRDNN acoustic model.

After pronunciation scores of each frame of the current frame and padding frames are calculated by using an acoustic model, it may be determined whether some frames of the current frame overlap padding frames of adjacent windows in 440.

Then, a determination is made as to whether there are overlapping frames in 440. In response to a determination that there are overlapping frames, pronunciation scores of some frames of the current window may be recalculated based on pre-calculated pronunciation scores of overlapping padding frames of adjacent windows in 450.

As described above, a final score may be calculated by obtaining an arithmetic mean or a geometric mean of pronunciation scores of overlapping frames of two windows. Further, if desirable, the final score may be calculated by applying different weighted values to the calculated pronunciation scores of overlapping frames and by obtaining an arithmetic mean or a geometric mean.

Subsequently, the calculated pronunciation scores of the extracted current window may be output in 460, so that a speech recognition apparatus may perform incremental speech recognition while the stream of the audio signal may continue to be provided.

Then, if audio signals are continuously input, with audio frames remaining to be processed in 470, the operation of extracting a window of the audio frames in 410 is repeated. If no audio frame remains to be processed, the process of calculating acoustic scores is completed.

Figure 8:
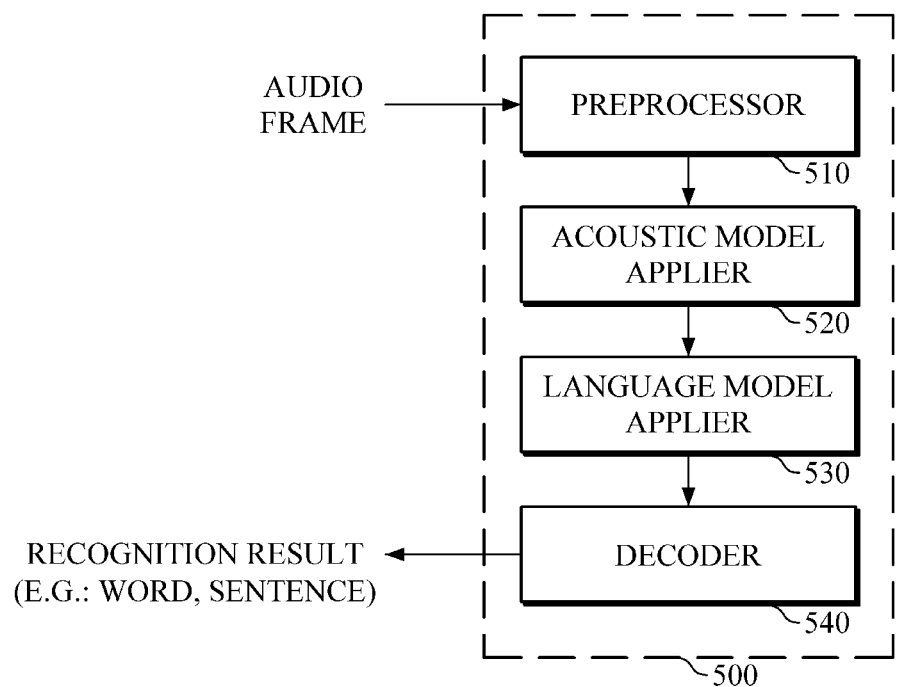
FIG. 8 is a block diagram illustrating an example of a speech recognition apparatus.

FIG. 8 is a block diagram illustrating another example of a speech recognition apparatus.

The speech recognition apparatus 500 may be configured according to either the apparatus 100 and apparatus 200 for calculating acoustic scores illustrated in FIGS. 1 and 2. The speech recognition apparatus 500 may include both hardware and software components.

Referring to FIG. 8, the speech recognition apparatus 500 includes a preprocessor 510, an acoustic model applier 520, a language model applier 530, and a decoder 540.

In response to receiving a set of frames that corresponds to a window size while the frames of an audio signal to be recognized are successively input, the preprocessor 510 extracts a window.

The acoustic model applier 520 inputs windows extracted by the preprocessor 510 into a DNN acoustic model, such as a BRDNN model, to calculate pronunciation scores of each frame of windows.

According to one example, the preprocessor 510 may add padding frames on both sides of an extracted window, and the acoustic model applier 520 may input the window, to which padding frames are added, into the DNN acoustic model, to calculate pronunciation scores of each frame of the window and padding frames, in which the DNN acoustic model may be the BRDNN acoustic model.

As padding frames are added to the window, some frames of the current window may overlap right padding frames of an adjacent window, e.g., a window extracted right before the current window. In this example, the acoustic model applier 520 may recalculate pronunciation scores of the overlapping frames of the current window by using a statistical method based on pronunciation scores of right padding frames of a previous window.

The language model applier 530 may output scores regarding information on words or sentences, such as scores regarding frequency of actual use of words or sentences, by using a language model, in which the language model may be based on an n-gram or a neural network.

The decoder 540 may incrementally decode pronunciation scores output of each window and output results of the language model applier 530 by using various decoding methods, and may output incremental recognition results for the current window.

For example, in response to pronunciation scores of the first window being output while audio frames are input, a recognition result of the first window is output by considering the pronunciation scores of the first window and word or sentence scores of a language model. Then, in response to pronunciation scores of the second window being output, a recognition result of the second window is output by considering the pronunciation scores of the second window and word or sentence scores of a language model. In this manner, after pronunciation scores are output for a new window, a recognition result may be output by incremental decoding.

The decoder 540 checks predetermined criteria for outputting a final recognition result, and if the predetermined criteria are satisfied, the decoder 540 may output an incremental recognition result, which is obtained up to the current window, as the final recognition result of an entire audio signal to be recognized. In this example, the predetermined criteria may be the number of windows, or a threshold of a recognition result. However, the above criteria are merely examples, and the criteria is not limited thereto.

For example, if the number of windows is determined to be a relatively small number (e.g., 2) so that a recognition result may be provided rapidly, the decoder 540 may output, as a final recognition result, an incremental recognition result obtained up to the second window.

Further, upon decoding pronunciation scores obtained up to the second window and word/sentence scores of the language model, if a probability of using a specific word/sentence is greater than a predetermined threshold (e.g., 70%), the decoder 540 may output, as a final recognition result, a recognition result obtained up to the second window.

In this example, speech recognition may be performed accurately by using an acoustic model based on the BRDNN, and a final recognition result may be incrementally obtained for segments of a speech before the entire speech is input.

Figure 9:
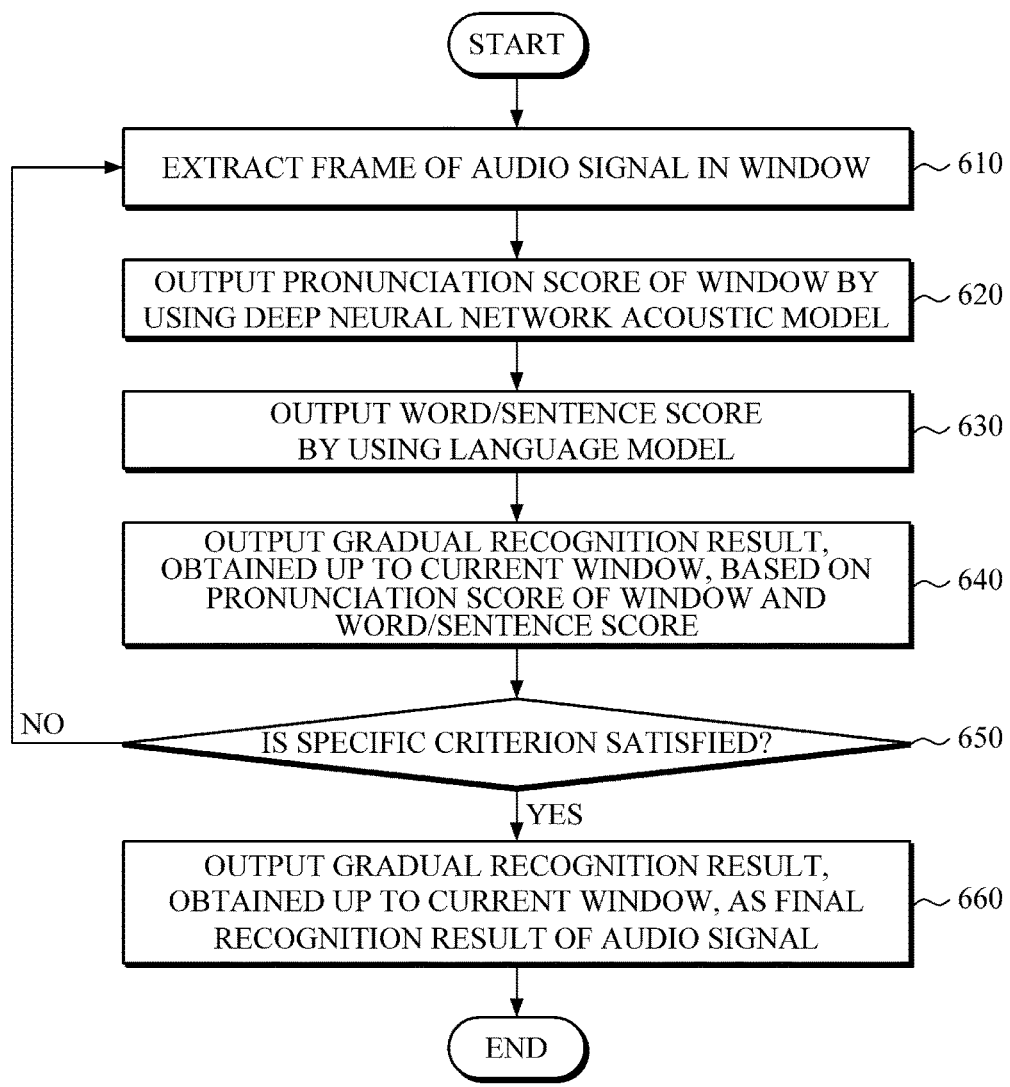
FIG. 9 is a flowchart illustrating an example of a speech recognition method.

FIG. 9 is a flowchart illustrating an example of a speech recognition method.

The speech recognition method illustrated in FIG. 9 may be performed by the speech recognition apparatus 500 illustrated in FIG. 8.

First, while frames of an audio signal to be recognized are being successively input, the speech recognition apparatus 500 extracts frames of the input audio signal in windows in 610.

Then, the speech recognition apparatus 500 may input the windows into the DNN acoustic model, such as a BRDNN acoustic model, to calculate and output pronunciation scores of each frame of the windows in 620.

In one embodiment, the speech recognition apparatus 500 may add padding frames on both sides of a window and may input the window, to which padding frames are added, into the DNN acoustic model, so as to calculate pronunciation scores of each frame and padding frames. As the padding frames are added to the window, some frames of the current window may overlap padding frames of an adjacent window. In this example, pronunciation scores of the overlapping frames of the current window may be recalculated by using a statistical method based on pre-calculated pronunciation scores of padding frames of a window right before the current window.

Subsequently, the speech recognition apparatus 500 may output word/sentence scores by using a language model in 630, in which the language model may be based on an n-gram or a neural network.

Then, the speech recognition apparatus 500 may incrementally decode pronunciation scores of each window and an output result of the language model applier 530 by using various decoding methods, to output an incremental recognition result obtained up to the current window in 640.

Next, the speech recognition apparatus 500 checks predetermined criteria in 650. If the predetermined criteria are satisfied, the speech recognition apparatus 500 may output an incremental recognition result, obtained up to the current window, as a final recognition result of an entire audio signal in 660, in which the predetermined criteria may be the number of windows or a threshold of a recognition result, but are not limited thereto.

Upon checking the criteria in 650, if the predetermined criteria are not satisfied, the operation of extracting a subsequent window of audio frames in 610 is performed.

Figure 10:
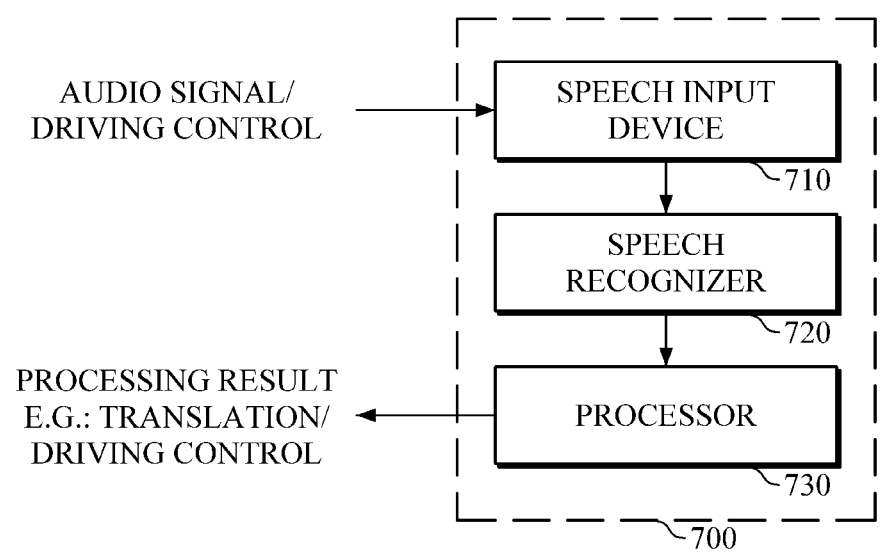
FIG. 10 is a block diagram illustrating an example of an electronic device to which speech recognition technology is applied.

FIG. 10 is a block diagram illustrating an example of an electronic device, to which speech recognition technology is applied.

According to this example, an electronic device 700 may be, but is not limited to, a TV set, a navigation device, a vehicle electronic device, a smartphone, a tablet PC, a smart watch, a desktop computer, a laptop computer, and the like.

Referring to FIG. 10, the electronic device 700 includes a speech input device 710, a speech recognizer 720, and a processor 730. The speech recognizer 720 may be the speech recognition apparatus 500 illustrated in FIG. 8 and manufactured in the form of hardware or software. In this example, the speech recognizer 720 may be construed as described above in the aforementioned embodiments, such that a repetitive description thereof will be omitted.

In this example, the speech input device 710 receives an audio signal. For instance, the speech input device 710 may receive a user's speech through a transducer or a microphone of the electronic device 700 or the like. Referring to FIG. 10, the user's audio signal may be related to sentences to be translated into another language or commands for controlling a TV set, driving a vehicle, or the like.

The speech receiver 720 performs a preprocessing process, in which an analog audio signal input by a user is converted into a digital signal, and the signal is divided into a plurality of audio frames. Further, the audio frames are divided into windows to be input to an acoustic model. The speech recognizer 720 may further add padding frames to both sides of a window and may input all the frames of the window, to which the padding frames are added, into an acoustic model, so as to calculate pronunciation scores of each frame. When the padding frames are added to a window, the added padding frames of the window may overlap some frames of an adjacent window. In this case, pronunciation scores of the overlapping frames may be re-calculated by using various statistical methods. In addition, the speech recognizer 720 may output word/sentence scores by using a language model.

The speech recognizer 720 may incrementally decode output results of an acoustic model and a language model for each window, and may output an incremental recognition result obtained up to the current window. If predetermined criteria are satisfied, the speech recognizer 720 may output, as a final recognition result of an entire audio signal, a recognition result obtained up to the current window.

The processor 730 may be a processor of the electronic apparatus 700 that controls functions of the electronic apparatus 700. The processor 730 may initiate the electronic apparatus 700 to perform an operation in response to the final recognition result being output by the speech recognizer 720. For example, the processor 730 may output the recognition result of speech input by a user in voice through a speaker and the like, or may provide the recognition result in a text format on a display. Further, the processor 730 may perform operations to process commands (e.g., power on/off, volume control, etc.) regarding the electronic apparatus 700.

Further, in an application in which the final recognition result is being translated into another language, the processor 730 may translate the final recognition result output in a text format into another language, and may output the translated result in voice or in a text format. However, the processor 730 is not limited thereto, and may be used in various other applications.

Figure 11:
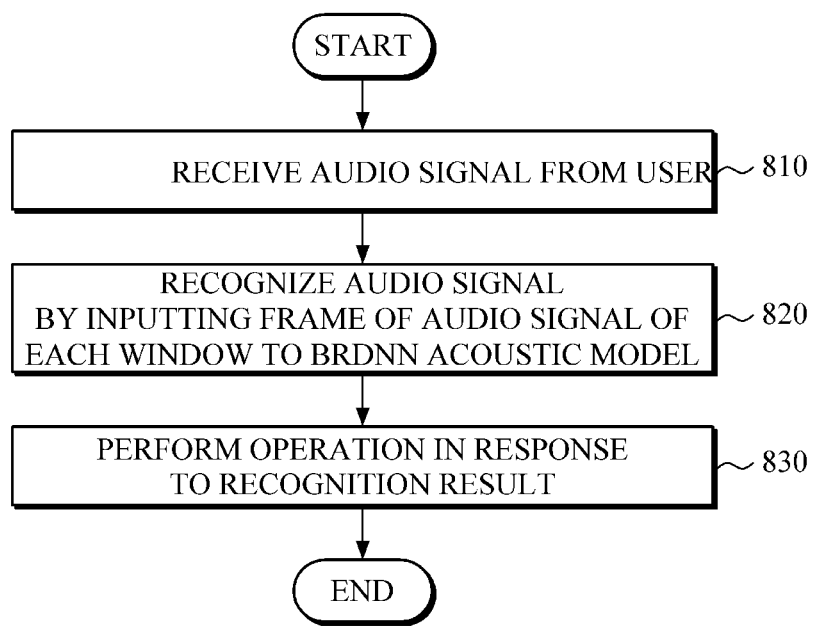
FIG. 11 is a flowchart illustrating an example of a speech recognition operation performed by the electronic device illustrated in FIG. 10.

FIG. 11 is a flowchart illustrating an example of a speech recognition operation performed by the electronic device illustrated in FIG. 10.

First, the electronic device 700 receives a user's audio signal input through a microphone or the like in 810.

Then, the electronic device 700 recognizes an audio signal in 820 by extracting frames of a user's audio signal in windows, calculating pronunciation scores of each window by using an acoustic model, and by incrementally decoding the pronunciation scores sequentially output for each window. In this example, the decoding may be performed by calculating word/sentence scores by using a language model, and by considering the calculated word/sentence scores.

The electronic device 700 may add padding frames to both sides of a window, and may input the window into the acoustic model. As the padding frames are added to a window, the added padding frames of the window may overlap with some frames of an adjacent window. In this example, pronunciation scores of the overlapping frames may be re-calculated by using various statistical methods based on pronunciation scores of the padding frames of the adjacent window that overlap the frames of the window. As a result, pronunciation scores may be calculated more accurately.

In one embodiment, the electronic device 700 checks whether criteria are satisfied, in which the criteria may be predetermined according to computing performance capability of the electronic device 700 or application fields of speech recognition (e.g., translation or processing of commands). If the predetermined criteria are satisfied, the electronic device 700 may output a recognition result, obtained up to the current window, as a final recognition result of an entire audio signal.

Then, in one example, the electronic device 700 performs an operation in response to the output final recognition result in 830. For example, the electronic device 700 may output the recognition result of speech input by a user in voice through a speaker and the like, or may provide the recognition result in a text format on a display. Further, the electronic device 700 may perform operations to process commands (e.g., power on/off, volume control, etc.) regarding the electronic apparatus 700. In an application in which the final recognition result is translated into another language, the electronic device 700 may translate the final recognition result output in a text format into another language, and may output the translated result in voice or in a text format.

The apparatuses, units, modules, devices, preprocessor, score calculator, padding adder, acoustic model applier, language model applier, decoder, speech input device, speech recognizer, processor and other components illustrated in FIGS. 1, 2, 8, 10, that perform the operations described herein with respect to FIGS. 3-7, 9 and 11 are implemented by hardware components. Examples of hardware components include controllers, sensors, generators, drivers, memories, comparators, arithmetic logic units, adders, subtractors, multipliers, dividers, integrators, transducer, microphone, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3-7 and 9-11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6, 7 and 9-11 that perform the operations described herein with respect to FIGS. 3-5 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for recognizing an audio signal, the apparatus comprising:
    a processor configured to:
        sequentially extract audio frames of the audio signal into respective plural windows of information without overlapping of same audio frames in successive windows of information over time;
        include non-zero padding frames in a window of information, of the plural windows of information, so that the window of information overlaps in time with one or more frames of an other window of information, of the plural windows of information, adjacent to the window of information;
        calculate first acoustic scores of each frame of the window of information, of the plural windows of information, using a deep neural network (DNN)-based acoustic model, by inputting the window of information, to which the non-zero padding frames are included, to input layers of the DNN-based acoustic model;
        recalculate second acoustic scores of the overlapping frames of the window of information based on pre-calculated acoustic scores of non-zero padding frames of the other window of information to update the first acoustic scores using the second acoustic scores with respect to the overlapping frames; and
        recognize the audio signal based on the first acoustic scores of the window of information and the second acoustic scores of the overlapping frames of the window of information.

2. The apparatus of claim 1, wherein the DNN is a bidirectional recurrent deep neural network (BRDNN).

3. The apparatus of claim 1, wherein, in the including of the non-zero padding frames, the processor is configured to include the non-zero padding frames in both right and left ends of the window of information.

4. The apparatus of claim 3, wherein a size of the window of information or a size of the non-zero padding frames is determined based on one or more of a speech recognition application field and computing performance capability of a device applied with the apparatus.

5. The apparatus of claim 1, wherein the non-zero padding frames included in the window of information overlap in time with the one or more frames of the other window of information, of the plural windows of information, adjacent to the window of information.

6. The apparatus of claim 1, wherein the processor recalculates the second acoustic scores of the overlapping frames of the window of information by using a statistical method.

7. The apparatus of claim 6, wherein the statistical method comprises calculating one of an arithmetic mean and a geometric mean.

8. The apparatus of claim 1, the first acoustic scores and the second acoustic scores indicate a probability of phonemes, pronunciations, morphemes, syllables, or words.

9. A processor implemented method of recognizing an audio signal, the method comprising:
    sequentially extracting audio frames of the audio signal into respective plural windows of information without overlapping of same audio frames in successive windows of information over time;
    including non-zero padding frames in a window of information, of the plural windows of information, so that the window of information overlaps in time with one or more frames of an other window of information, of the plural windows of information, adjacent to the window of information;

calculating first acoustic scores of the window of information, of the plural windows of information, using a deep neural network (DNN)-based acoustic model, by inputting the window of information, to which the non-zero padding frames are included, to input layers of the DNN-based acoustic model;

recalculating second acoustic scores of the overlapping frames of the window of information based on pre-calculated acoustic scores of non-zero padding frames of the other window of information to update the first acoustic scores using the second acoustic scores with respect to the overlapping frames; and recognizing the audio signal based on the first acoustic scores of the window of information and the second acoustic scores of the overlapping frames of the window of information.

10. The method of claim 9, wherein the DNN is a bidirectional recurrent deep neural network (BRDNN).

11. The method of claim 9, further comprising including the non-zero padding frames in both right and left ends of the window of information.

12. The method of claim 9, wherein the non-zero padding frames included in the window of information overlap in time with one or more frames of the other window of information, of the plural windows of information, adjacent to the window of information.

13. The method of claim 12, wherein a size of the window of information or a size of the non-zero padding frames is determined based on one or more of a speech recognition application field and computing performance capability of an apparatus performing the method.

14. The method of claim 9, wherein the second acoustic scores of the overlapping frames of the window of information is recalculated by using a statistical method.

15. The method of claim 14, wherein the statistical method comprises one of an arithmetic mean and a geometric mean.

16. A speech recognition apparatus, comprising:
a processor configured to:
extract frames of an audio signal, while the frames are successively input, into respective plural windows of information without overlapping of same frames in successive windows of information over time;
include non-zero padding frames in a window of information, of the plural windows of information, so that the window of information overlaps in time with one or more frames of an other window of information, of the plural windows of information, adjacent to the window of information;
calculate first acoustic scores of the window of information, of the plural windows of information, using a deep neural network (DNN)-based acoustic model, by inputting the window of information to input layers of the DNN-based acoustic model;
recalculate second acoustic scores of the overlapping frames of the window of information based on pre-calculated acoustic scores of non-zero padding frames of the other window of information to update the first acoustic scores using the second acoustic scores with respect to the overlapping frames; and
generate an incremental recognition result, obtained up to a current window, by recognizing the audio signal based on the first acoustic scores of the window of information and the second acoustic scores of the overlapping frames of the window of information.

17. The apparatus of claim 16, wherein the processor is further configured to calculate one or more word or sentence scores of the window of information by using a language model, and
wherein the processor generates the incremental recognition result, obtained up to the current window, further based on the one or more word or sentence scores.

18. The apparatus of claim 17, wherein the language model is based on an n-gram or a neural network.

19. The apparatus of claim 16, wherein in response to predetermined criteria being satisfied, the processor generates the incremental recognition result obtained up to the current window as a final recognition result of the audio signal.

20. The apparatus of claim 16, wherein the DNN is a bidirectional recurrent deep neural network (BRDNN).

21. The apparatus of claim 16, wherein, in the including of the non-zero padding frames, the processor is configured to include the non-zero padding frames in both right and left ends of the window of information, and the processor is further configured to calculate the first acoustic scores of each frame of the window of information, in which the non-zero padding frames are included.

22. A processor implemented method of speech recognition, the method comprising:
extracting frames of an audio signal, while the frames are successively input, into respective plural windows of information without overlapping of same frames in successive windows of information over time;
including non-zero padding frames in a window of information, of the plural windows of information, so that the window of information overlaps in time with one or more frames of an other window of information, of the plural windows of information, adjacent to the window of information;
calculating first acoustic scores of the window of information, of the plural windows of information, using a deep neural network (DNN)-based acoustic model, by inputting the window of information, to which the non-zero padding frames are included, to input layers of the DNN-based acoustic model;
recalculating second acoustic scores of the overlapping frames of the window of information based on pre-calculated acoustic scores of non-zero padding frames of the other window of information to update the first acoustic scores using the second acoustic scores with respect to the overlapping frames; and
generating an incremental recognition result, obtained up to a current window, by recognizing the audio signal based on the first acoustic scores of the window of information and the second acoustic scores thereof.

23. The method of claim 22, further comprising calculating one or more word or sentence scores of the window of information by using a language model,
wherein the generating of the incremental recognition result comprises generating the incremental recognition result, obtained up to the current window, further based on the one or more word or sentence scores.

24. The method of claim 22, further comprising:
determining whether predetermined criteria are satisfied; and
in response to a determination that the predetermined criteria are satisfied, generating the incremental recognition result obtained up to the current window as a final recognition result of the audio signal.

25. The method of claim 22, further comprising including the non-zero padding frames on both right and left sides of the window of information,
wherein the calculating of the first acoustic scores comprises calculating the first acoustic scores of each frame of the window of information, in which the non-zero padding frames are included.

26. An electronic device, comprising:
a processor configured to:
receive an audio signal from a user;
sequentially extract frames into respective plural windows of information without overlapping of same frames in successive windows of information over time;
include non-zero padding frames in a window of information, of the plural windows of information, so that the window of information overlaps in time with one or more frames of an other window of information, of the plural windows of information, adjacent to the window of information;
recognize the audio signal of the user by inputting the window of information, to which the non-zero padding frames are included, to input layers of a deep neural network (DNN)-based acoustic model, by calculating first acoustic scores of the window of information, of the plural windows of information, using the DNN-based acoustic model while the audio signal is input, by recalculating second acoustic scores of the overlapping frames of the window of information based on pre-calculated acoustic scores of non-zero padding frames of the other window of information, and by incrementally decoding the calculating first acoustic scores of the window of information in consideration of the recalculated second acoustic scores thereof; and
perform a predetermined operation based on a result of the recognizing of the audio signal of the user.

27. The electronic device of claim 26, wherein the operation comprises at least one of outputting the result of the recognizing in voice or in a text format, translation of the result of the recognizing into another language, and processing of commands for controlling the electronic device.

* * * * *